United States Patent Office 3,334,090
Patented Aug. 1, 1967

3,334,090
THIENO-PYRIDO-BENZODIAZEPIN-ONES
Hans Ott, Convent Station, N.J., assignor to
Sandoz Inc., Hanover, N.J.
No Drawing. Filed May 28, 1965, Ser. No. 459,935
7 Claims. (Cl. 260—239.3)

This invention is directed to pharmaceutically acceptable thienopyridobenzodiazepines, particularly those of the formula

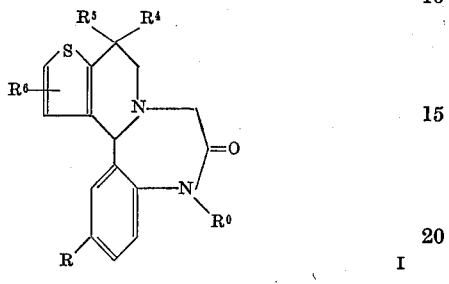

wherein

R is either $R^1$; amino (—$NH_2$); or di(lower)alkylamino, e.g. dimethylamino;

$R^0$ is either $R^2$; lower alkenyl, the α-carbon of which is saturated, e.g. allyl; lower alkynyl, the α-carbon of which is saturated, e.g. propargyl; or di(lower)alkylamino(lower)alkyl, the alkylene bridge of which has a carbon chain of at least 2 carbon atoms, e.g. γ-dimethylamino-propyl and β-(N-methyl-N-ethyl)-aminoethyl;

$R^1$ is either a hydrogen atom (—H); a halogen atom, e.g. a chlorine atom (—Cl), a bromine atom (—Br), and a fluorine atom (—F); trifluoromethyl (—$CF_3$); nitro (—$NO_2$);

$R^2$ is either a hydrogen atom (—H); or lower alkyl, e.g. methyl, ethyl, propyl, isopropyl and butyl;

$R^3$ is either a hydrogen atom (—H) or methyl, $R^3$ being a hydrogen atom when either $R^4$ or $R^5$ is lower alkyl;

$R^4$ is either a hydrogen atom (—H) or straight chain lower alkyl, e.g. methyl, ethyl, propyl and butyl; $R^4$ being a hydrogen atom when $R^3$ is methyl;

$R^5$ is either a hydrogen atom (—H) or lower straight chain alkyl, e.g. methyl, ethyl, propyl and butyl; $R^5$ being a hydrogen atom when $R^3$ is methyl; and $R^6$ is either a hydrogen atom (—H); lower alkyl, e.g. methyl, ethyl, propyl, isopropyl and butyl; or a halogen atom, e.g. —Cl, —Br, or —F; and is either in the 1- or in the 2-position;

acid addition salts thereof and N-oxides thereof. In addition, this invention is directed to the novel intermediates in the preparation of compounds I as well as the stereoisomers of compounds I.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid ($H_3C$—$SO_3H$); dibasic acids, e.g. succinic acid; tribasic acids, e.g. phosphoric acid and citric acid; saturated acids, e.g. acetic acid; ethylenically unsaturated acids, e.g. maleic acid and fumaric acid, and aromatic acids, e.g. salicyclic acid and arysulfonic acids, such as benzenesulfonic acid. The only limitation on the acid selected is that the resulting acid addition salt be pharmaceutically acceptable; the acid does not nullify the therapeutic properties of compounds I. It is preferred, however, to select an acid so that the salt therewith is water-soluble; tartaric acid and succinic acid are preferred for this purpose.

Compounds I have one asymmetric center when each of $R^3$, $R^4$ and $R^5$ is a hydrogen atom and two asymmetric centers when either $R^3$ is methyl or $R^4$ and $R^5$ differ from each other. In the former case compounds I exist as a racemate or as optical antipodes (enantiomers); in the latter, geometric isomers also exist. All of the stereoisomers are within the scope of this invention. Resolution of racemates into optical antipodes and separation of mixtures of diastereoisomeric compounds is effected according to procedures well-known to the art-skilled.

Compounds I are prepared according to the following reaction scheme:

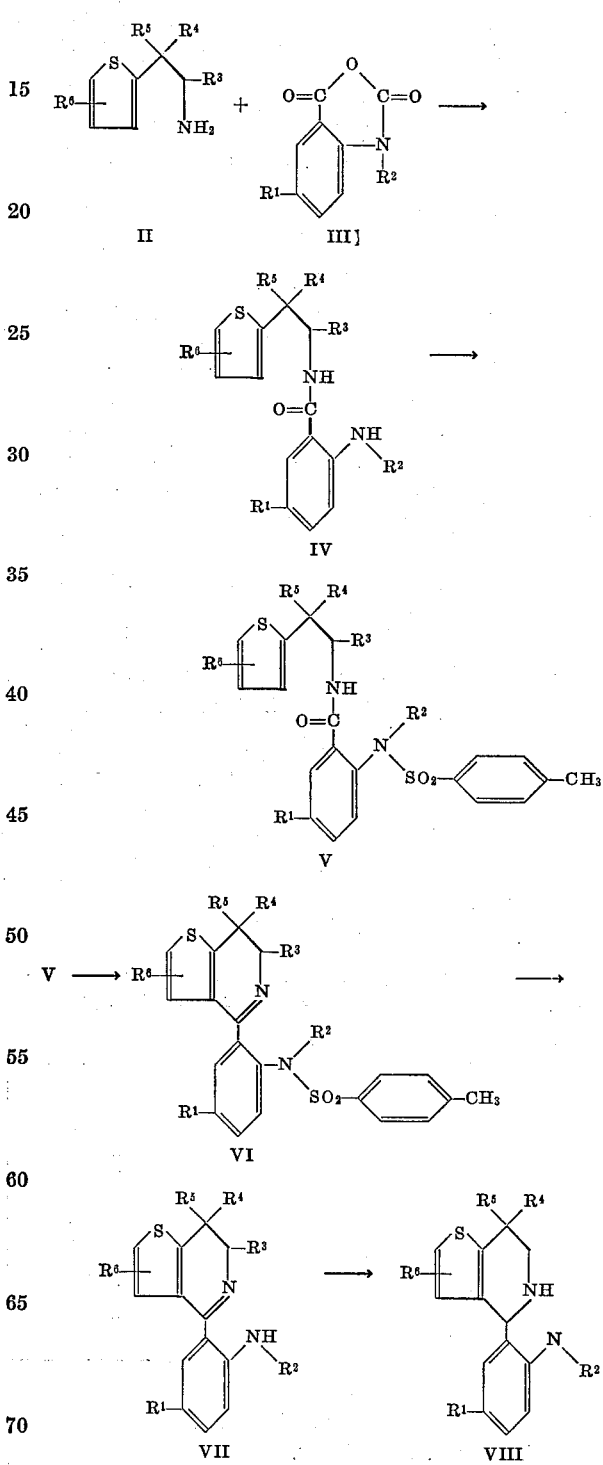

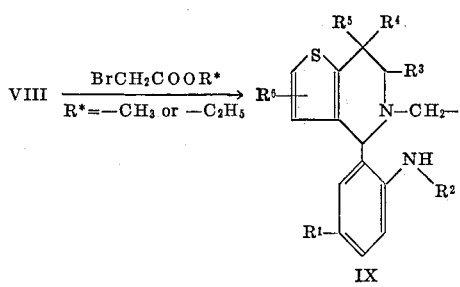

The starting materials II and III are either known compounds or are readily prepared by the art-skilled according to established procedures from available compounds.

Condensation starts rapidly at room temperature (20° C.) on admixture of compounds II and III in an inert solvent, such as tetrahydrofurane, dioxane, dimethylformamide (DMF) and dimethylsulfoxide (DMSO), with evolution of carbon dioxide; completion of the condensation is effected by heating for about thirty minutes on a steam bath. Compound IV is thereafter precipitated on addition of water to the thus-obtained solution.

To protect the amino group of intermediate IV during the ring closure, the use of said intermediate in the form of its tosylate is satisfactory, but other protecting groups, such as mesyl, brosyl and benzene sulfonyl, are alternatively employed. The preparation of the tosylate V is carried out in the usual well-known manner either under Schotten-Baumann conditions or in pyridine.

Ring closure of the tosylate to the corresponding compound VI occurs on refluxing tosylate V in admixture with phosphorus oxychloride. Other well-known dehydrating agents to bring about this ring closure are phosphorus pentoxide in xylene or polyphosphoric acid. When $R^2$ is hydrogen (—H) the reagent of choice for the ring closure is phosphorus pentoxide. Detosylation of VI is effected by dissolving same in concentrated sulfuric acid. Care must be taken to stop the reaction prior to sulfonation of the thienyl ring.

To obtain better yields, compound VI and phenol are dissolved in a glacial acetic acid solution of hydrogen bromide, and the thus-obtained solution is heated at a temperature between 50° and 60° C. This is the preferred manner for obtaining compound VII.

Compound VIII is prepared by refluxing an ethanolic solution of VII with sodium borohydride. Refluxing VIII with methyl or ethyl bromoacetate or chloroacetate and a tertiary base, e.g. triethylamine, in ethanolic solution results in the preparation of compound IX. Boiling compound IX in glacial acetic acid results in the preparation of compound I.

Other procedures for the ring closure can also be successfully employed. Such procedures are heating the ester IX in anhydrous methoxyethanol, containing some sodium methoxyethoxide for 1 to 3 hours at reflux, or saponifying the ester IX and heating the resulting amino acid to 140° to 160° C. for from 1 to 2 hours.

Compounds I wherein R is either amino or dialkylamino are prepared from the corresponding compound I wherein R is nitro. The nitro group is reduced to obtain the amino (—NH₂) substituent in its place. Reductive dialkylation changes the nitro group to a dialkylamino group having both alkyl groups identical, preferably dimethylamino and dialkylamino. The procedures for preparing both the amino and the dialkylamino substituents from a similarly-placed nitro group are standard procedures well-known to the art-skilled and are not, per se, an essential part of the instant invention.

To prepare compounds I where $R^0$ is other than $R^2$, the corresponding compound I wherein $R^0$ is a hydrogen atom (—H) is dissolved in anhydrous dimethylformamide prior to admixture with sodium hydride and $R^0$—X, wherein $R^0$ is the desired substituent, e.g. allyl and propargyl, and X is either a chlorine atom (—Cl) or a bromine atom (—Br). This procedure is illustrated in Example 9. In place of the propargyl bromide, β-dimethylaminoethyl chloride is employed to obtain the corresponding side chain for $R^0$.

The N-oxide, i.e., 6-oxide, of compound I ($R=R^1$; $R^0=R^2$) is prepared by the oxidation of the corresponding compound I with peracid, e.g. perbenzoic acid, m-chloro-perbenzoic acid and peracetic acid. When $R^2$ of compound I is a hydrogen atom, oxidation may occur simultaneously on the amide nitrogen ($N_9$) to give the corresponding cyclic hydroxamic acid derivative, i.e. the corresponding N-oxide wherein $R^2$ is hydroxyl (—OH). In the N-oxides, therefore, $R^2$ can be —OH, rather than —H.

The introduction of an oxygen atom at $N_6$ gives rise to a new asymmetric center ($N_6$), but this N-oxidation occurs stereospecifically, leading to a trans-junction of the two rings to which $N_6$ is common and does not give rise to additional stereoisomers.

The isolation of chemical individuals among the stereoisomers of compounds I, corresponding acid addition salts and N-oxides does not constitute an essential part of this invention, but the chemical individuals are within the scope of said invention. When a chemical individual I is employed as an intermediate for the preparation of an acid addition salt or an N-oxide, the final product has the same stereochemistry as the intermediate. Likewise, optically active compounds I are prepared from corresponding optically active intermediates, e.g. that corresponding to the title compound of Example 5 is resolved by preparing the tartrate from an enantiomer of tartaric acid.

The acid addition salts are prepared according to well-established standard techniques which do not constitute part of this invention.

Exemplary embodiments, prepared according to the above-described procedures, are presented in the following table. The starting materials and the intermediates are reflected by the definition of substituents.

| R | $R^0$ | $R^3$ | $R^4$ | $R^5$ | $R^6$ | Position of $R^6$ |
|---|---|---|---|---|---|---|
| —H | —C₃H₆—N(Et)₂ | —Me | —H | —H | —Et | 1 |
| —Cl | —Me | —H | —H | —H | —Pr | 1 |
| —Br | —H | —H | —H | —H | —iPr | 2 |
| —F | —Me | —Me | —H | —H | —Br | 2 |
| —NH₂ | —Et | —H | —Pr | —H | —H | 1 |
| —N(CH₃)₂ | —Pr | —Me | —H | —H | —Cl | 1 |
| —Cl | —iPr | —Me | —H | —H | —F | 2 |
| —Br | —Bu | —H | —Me | —Et | —Pr | 2 |
| —H | —Al | —Me | —H | —H | —Et | 1 |
| —H | —Pg | —H | —Me | —Me | —Me | 1 |
| —CF₃ | —C₂H₄—N(Me)₂ | —H | —Et | —Et | —H | 2 |
| —NO₂ | —C₂H₄—N(Et)₂ | —Me | —H | —H | —Me | 2 | wherein, in addition to standard elemental symbols, Me stands for methyl,

Et stands for ethyl,
Pr stands for propyl,
iPr stands for isopropyl,
Bu stands for butyl,
Al stands for allyl, and
Pg stands for propargyl.

Compounds I, their pharmaceutically acceptable acid addition salts and their N-oxides have CNS (central nervous system) activity. They are useful as tranquilizers, sedatives, anti-anxiety drugs, anti-inflammatories and anti-convulsants. They are administered either orally or parenterally in standard dosage forms in average daily doses of from 10 to 200 milligrams.

Each of the pharmaceutically active compounds of this invention, may be, e.g., incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD–30 and purified water. An exemplary tabletting formulation for the instant active compounds is:

| | Parts |
|---|---|
| Title Compound of Example 7 | 60 |
| Tragacanth | 2 |
| Lactose | 29.5 |
| Corn starch | 5 |
| Talcum | 3 |
| Magnesium stearate | 0.5 |
| Alcohol SD–30 } | q.s. |
| Purified water } | |

The following examples are merely illustrative of the invention. All temperatures are in degrees centigrade. Parts and percentages are in weight unless otherwise specified, the relationship between parts by weight and parts by volume being the same as that between the kilogram and the liter.

EXAMPLE 1

N-(β-2-thienylethyl)-2-methylamino-5-chloro-benzamide

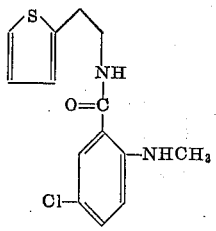

Dissolve 2.7 parts of β-2-thienyl-ethylamine in 9 parts by volume of dioxane and add thereto 4.3 parts of 6-chloro-N-methyl-isatoic anhyride. After the initial reaction ceases, heat the mixture on a steam bath for thirty minutes. After cooling, add 20 parts by volume of water thereto to cause precipitation of 5.7 parts of title compound, M.P. 138° to 140°.

Replacing the 6-chloro-N-methyl-isatoic anhydride by an equivalent of either N-methyl-isatoic anhydride, 6-chloro - isatoic anhydride, 6 - trifluoromethyl-N-methyl-isatoic anhydride or 6-nitro-isatoic anhydride, results in the preparation in similar manner of the corresponding compound IV.

Likewise, replacing the β-2-thienyl-ethylamine by an equivalent of either β-dimethyl-B-2-thienyl-ethylamine of α-methyl-β-2-thienyl-ethylamine, results in the preparation in similar manner of the corresponding compound IV.

EXAMPLE 2

N-(β-2-thienylethyl)-5-chloro-2-methyltosylamino-benzamide

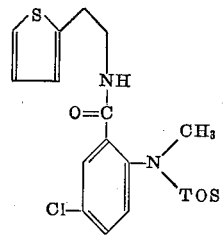

Dissolve 5.5 parts of N-(β-2-thienylethyl)-5-chloro-2-methylamino-benzamide in 25 parts by volume of pyridine and add 5.3 parts of p-toluenesulfonylchloride to the obtained solution. Heat the resulting mixture for 90 minutes at 60°. Cool the obtained clear, brown solution and add 5 parts by volume of water to the cooled solution. After maintaining the mixture for 30 minutes at room temperature, evaporate same in vacuo and transfer the residue into a separatory funnel with ethyl acetate and water. Extract the organic phase twice with dilute sodium hydrogen carbonate solution. Dry the organic phase over sodium sulfate and then evaporate same in vacuo. Crystallize the obtained oily residue from diethylether. 7.2 parts of title compound, M.P. 109° are thus obtained.

Replacing the N-(β-2-thienylethyl)-2-methylamino-5-chloro-benzamide by an equivalent of N-(α-methyl-β-2-thienylethyl) - 2-methylamino-5-bromo-benzamide [prepared according to the method of Example 1] results in the preparation, in similar manner, of the corresponding compound V.

EXAMPLE 3

(a) 4-(5-chloro-2-methyltosylamino-phenyl)-6,7-dihydro-thieno[3,2-c]-pyridine

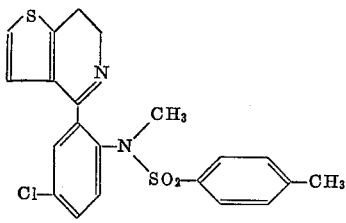

Reflux 6 parts of the title compound of Example 2 in 40 parts by volume of phosphorus oxychloride for 90 minutes. After evaporation in vacuo, dissolve the residue in methylene chloride and extract twice with 1N sodium hydroxide solution. Dry the resultant over sodium sulfate and evaporate same in vacuo to obtain 5.6 parts of title compound as an oil.

This procedure is employed only when R² is lower alkyl.

(b) 4-(5-chloro-2-tosylamino-phenyl)6,7-dihydro-thieno[3,2-c]pyridine

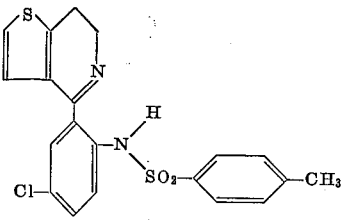

Reflux the mixture of 4 parts of N-(β-2-thienylethyl)-5-chloro-2-tosylamino-benzamide and 5 parts of phosphorus pentoxide in 40 parts by volume of dry xylene for 5 hours. Decant the xylene and decompose the residue with ice and 20% sodium hydroxide solution. Extract the alkaline aqueous phase twice with ethyl acetate; wash the organic phase with sodium chloride solution; dry the resultant over sodium sulfate and then evaporate the dried material in vacuo. Three parts of the title compound are thus obtained as a red oil.

Replacing the N-(β-2-thienylethyl)-5-chloro-2-tosylamino-benzamide by an equivalent of N-(β-2-thienylethyl)-5-nitro-2-tosylamino-benzamide results in the preparation, in similar manner, of the corresponding compound VI.

This procedure is employed when $R^2$ is either a hydrogen atom or lower alkyl.

EXAMPLE 4

*4-(5-chloro-2-methylamino-phenyl)6,7-dihydro-thieno[3,2-c]pyridine*

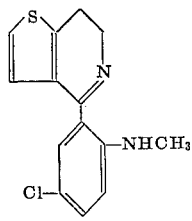

(a) Dissolve 0.5 part of the title compound of Example 3 in 3 parts by volume of concentrated sulfuric acid, and maintain the obtained solution for two hours at room temperature. Add ice and concentrated sodium hydroxide solution thereto until the thus-produced mixture is alkaline. Extract same twice with methylene chloride; wash the organic phase with water; then dry same over sodium sulfate and evaporate in vacuo. Dissolve the residue in ethylacetate and filter off the insoluble materials. After evaporation, 0.16 part of amorphous title compound results.

(b) The mixture of 3.1 parts of the tosylate and 1.44 parts of phenol dissolved in 21 parts by volume of 30% hydrogen bromide in acetic acid is heated to 50° for 17 hours. The clear solution is evaporated, ice and methylene chloride are added and the organic phase is extracted with ice cold 2N sodium hydroxide solution and with water. After drying over sodium sulfate and evaporation in vacuo, 2 parts of title compound are obtained as an oil.

Replacing 4-(5-chloro-2-methyltosylamino-phenyl)6,7-dihydro-thieno[3,2-c]pyridine by an equivalent of 4-(2-tosyl-amino-phenyl)-7-propyl-6,7-dihydro-thieno[3,2-c]pyridine results in the preparation, in similar manner, of the corresponding compound VII.

EXAMPLE 5

*4-(5-chloro-2-methylamino-phenyl)-4,5,6,7-tetrahydro-thieno[3,2-c]pyridine*

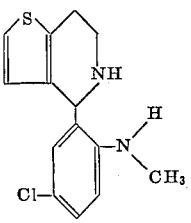

Dissolve 2.3 parts of 4-(5-chloro-2-methylaminophenyl)-6,7-dihydro-thieno[3,2-c]pyridine in 100 parts by volume of 90% ethanol; add 3 parts of sodium borohydride thereto and reflux the resultant for 2.5 hours. After cooling, add acetic acid to destroy the excess sodium borohydride, and then acidigy the mixture with hydrochloric acid. Evaporate the ethanol in vacuo, make the solution alkaline by addition thereto of dilute sodium hydroxide and extract the aqueous phase three times with methylene chloride. Collect the organic phases, dry same over sodium sulfate and evaporate in vacuo. Crystallize from ethanol to obtain 1.8 parts of the title compound, M.P. 90–91°/111–112°.

Replacing the 4-(5-chloro-2-methylamino-phenyl)-6,7-dihydro-thieno[3,2-c]pyridine by an equivalent of 3-bromo-4-(5-chloro-2-methylamino-phenyl)-6,7-dihydro-thieno[3,2-c]pyridine results in the preparation, in similar manner, of the corresponding compound VIII.

EXAMPLE 6

*4-(5-chloro-2-methylamino-phenyl)-5-carbethoxymethyl-4,5,6,7-tetrahydro-thieno[3,2-c]pyridine*

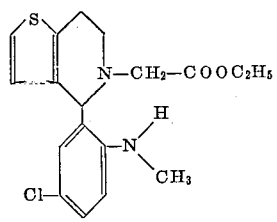

Reflux the mixture of 13.9 parts of 4-(5-chloro-2-methylamino-phenyl)-4,5,6,7-tetrahydro-thieno[3,2-c]pyridine, 10.6 parts of triethylamine and 16.7 parts of ethyl bromoacetate in 200 parts by volume of absolute ethanol for 17 hours. Evaporate the solvent, dissolve the residue in benzene and extract the organic phase twice with 0.5 N hydrochloric acid to remove unreacted starting material. Wash the organic phase with water and with sodium hydrogencarbonate. Dry the benzene solution over sodium sulfate and evaporate in vacuo to obtain 16 parts of title compound as a light yellow oil.

Replacing the 4-(5-chloro-2-methylamino-phenyl)-4,5,6,7-tetrahydro-thieno[3,2-c]pyridine by an equivalent of 2-bromo-4-(2-amino-5-trifluoromethyl-phenyl)-4,5,6,7-tetrahydro-thieno[3,2-c]pyridine results in the preparation, in similar manner, of the corresponding compound IX.

EXAMPLE 7

*12-chloro-9-methyl-4,5,7,8,9,13b-hexahydro-thieno[3,2-c]pyrido[1,2-d]benzo[1,4]diazepin-8-one*

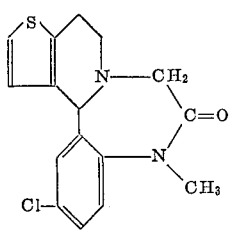

Reflux 16 parts of 4-(5-chloro-2-methylamino-phenyl)-5-carbethoxymethyl-4,5,6,7-tetrahydro-thieno[3,2-c]pyridine in 175 parts by volume of glacial acetic acid for 2.5 hours, distilling off half of the solvent simultaneously. Evaporate the reaction mixture in vacuo and dissolve the residue in ethylacetate. Extract this solution three times with dilute hydrochloric acid. Neutralize the combined aqueous phases with sodium hydroxide solution and extract same three times with methylene chloride. Dry the methylene chloride solution over sodium sulfate and evaporate in vacuo. On addition of ethanol, 11 parts of title compound, M.P. 150° to 152°, crystallize out.

Replacing the 4-(5-chloro-2-methylamino-phenyl)-5-carbethoxymethyl-4,5,6,7-tetrahydro-thieno[3,2-c]pyridine by an equivalent of 2-methyl-4-(2-methylamino-phenyl)-5-carbethoxymethyl-4,5,6,7-tetrahydrothieno[3,2-c]pyridine results in the preparation, in similar manner, of the corresponding compound I.

EXAMPLE 8

*N-oxide of 12-chloro-9-methyl-4,5,7,8,9,13b-hexahydro-thieno[3,2-c]pyrido[1,2-d]benzo[1,4]diazepin-8-one*

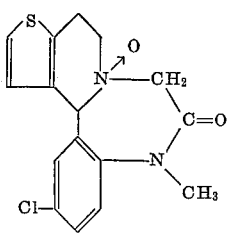

To 0.64 part of 12-chloro-9-methyl-4,5,7,8,9,13b-hexahydro - thieno[3,2-c]pyrido[1,2-d]benzo[1,4]diazepin - 8-one in 12 parts by volume of methylene chloride at 0° add slowly 0.5 part of m-chloro-perbenzoic acid under stirring. Continue stirring for 15 minutes. Extract the methylene chloride solution with dilute ammonia and then with water. After drying over sodium sulfate and evaporation, 0.4 part of the title compound, M.P. 180°, are obtained.

Replacing the title compound of Example 7 with either 1,12 - dichloro - 9-methyl-4,5,7,8,9,13b-hexahydro-thieno [3,2-c]pyrido[1,2-d]benzo[1,4]diazepin-8-one or 2-chloro - 9-methyl-4,5,7,8,9,13b-hexahydro-thieno[3,2-c]pyrido [1,2-d]benzo[1,4]diazepin-8-one results in the preparation, in similar manner, of the corresponding N-oxide of compound I. Likewise, replacing the title compound of Example 7 with an equivalent of 2-ethyl-4,5,7,8,9,13b-hexahydro - thieno[3,2-c]pyrido[1,2-d]benzo[1,4]diazepin-8-one results in the preparation, in similar manner, of the N-oxide of 2-ethyl-9-hydroxy-4,5,7,8,9,13b - hexahydro-thieno[3,2-c]pyrido[1,2-d]benzo[1,4]diazepin-8-one.

EXAMPLE 9

*12-chloro-9-propargyl-4,5,7,8,9,13b-hexahydro-thieno [3,2-c]pyrido[1,2-d]benzo[1,4]diazepin-8-one*

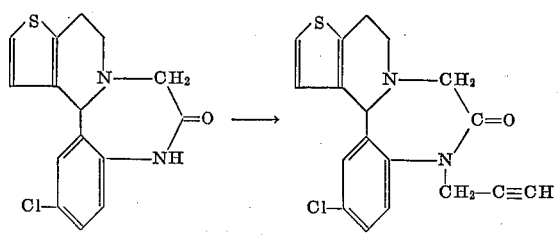

Dissolve 1 part of 12-chloro-9-methyl-4,5,7,8,9,13b-hexahydro - thieno[3,2-c]pyrido[1,2-d]benzo[1,4]diazepin-8-one in 20 parts by volume of anhydrous dimethylformamide and add 0.16 part of sodium hydride (56% in mineral oil) at room temperature. On heating to 60° the sodium hydride goes slowly into solution. To the so-obtained solution add over a period of ten minutes 0.5 part of propargyl bromide in 6 parts of anhydrous dimethylformamide and heat the mixture to 60° to 65° for 6 hours. After addition thereto of 0.1 part of glacial acetic acid, evaporate the solvent in vacuo. Dissolve the residue in methylene chloride and extract twice with water, dry over sodium sulfate and evaporate in vacuo. 1.1 parts of title compound are thus obtained.

It is thought that the invention and its advantages are understood from the foregoing description. Various changes may be made in the intermediates and the final products (including the pharmaceutically acceptable acid addition salts and the N-oxides of compounds I) without departing from the spirit and the scope of the invention or sacrificing its material advantages. The starting materials, intermediates and final products set forth hereinbefore are merely illustrative embodiments.

What is claimed is:

1. A pharmaceutically acceptable 4,5,7,8,9,13b-hexahydro - thieno[3,2-c]pyrido[1,2-d]benzo[1,4]diazepin - 8-one selected from compounds of the formula

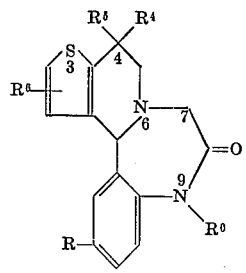

wherein

R is a member selected from the group consisting of a hydrogen atom, a halogen atom, trifluoromethyl, nitro, amino and di(lower)alkylamino, the two alkyl groups being identical;

$R^0$ is a member selected from the group consisting of a hydrogen atom, alkyl having from 1 to 4 carbon atoms, alkenyl having from 3 to 5 carbon atoms with a saturated α-carbon atom, alkynyl having from 3 to 5 carbon atoms with a saturated α-carbon atom and di(lower)alkylamino(lower)alkyl, at least 2 carbon atoms separating the amino nitrogen from $N_9$;

each of $R^4$ and $R^5$ is, independently, a member selected from the group consisting of a hydrogen atom, methyl, ethyl, propyl and butyl;

$R^6$ is a member selected from the group consisting of a hydrogen atom, alkyl having from 1 to 4 carbon atoms, a fluorine atom, a chlorine atom and a bromine atom, and is either in the 1- or in the 2-position;

and acid addition salts thereof.

2. A compound of the formula

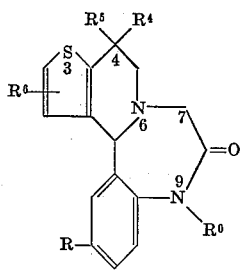

wherein

R is a member selected from the group consisting of a hydrogen atom, a halogen atom, trifluoromethyl, nitro, amino and di(lower)alkylamino, the two alkyl groups being identical;

$R^0$ is a member selected from the group consisting of a hydrogen atom, alkyl having from 1 to 4 carbon atoms, alkenyl having from 3 to 5 carbon atoms with a saturated α-carbon atom, alkynyl having from 3 to 5 carbon atoms with a saturated α-carbon atom and di(lower)alkylamino(lower)alkyl, at least 2 carbon atoms separating the amino nitrogen from $N_9$;

each of $R^4$ and $R^5$ is, independently, a member selected from the group consisting of a hydrogen atom, methyl, ethyl, propyl and butyl; and $R^6$ is a member selected from the group consisting of a hydrogen atom, alkyl having from 1 to 4 carbon atoms, a fluorine atom, a chlorine atom and a bromine atom, and is either in the 1- or in the 2-position.

3. 12 - chloro-9-methyl-4,5,7,8,9,12b-hexahydro-thieno-[3,2-c]pyrido[1,2-d]benzo[1,4]diazepin-8-one.

4. A compound of the formula

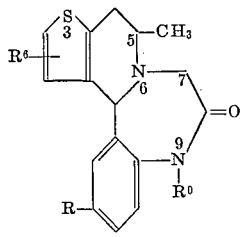

wherein

R is a member selected from the group consisting of a hydrogen atom, a halogen atom, trifluoromethyl, nitro, amino and di(lower)alkylamino, the two alkyl groups being identical;

$R^0$ is a member selected from the group consisting of a hydrogen atom, alkyl having from 1 to 4 carbon atoms, alkenyl having from 3 to 5 carbon atoms with a saturated α-carbon atom, alkynyl having from 3 to 5 carbon atoms with a saturated α-carbon atom and di(lower)alkylamino(lower)alkyl, at least 2 carbon atoms separating the amino nitrogen from $N_9$; and $R^6$ is a member selected from the group consisting of a hydrogen atom, alkyl having from 1 to 4 carbon atoms, a fluorine atom, a chlorine atom and a bromine atom, and is either in the 1- or in the 2-position.

5. A pharmaceutically acceptable acid addition salt of a compound of the formula

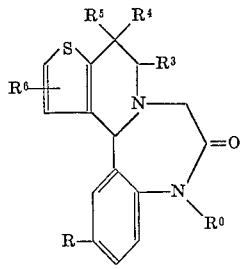

wherein

R is a member selected from the group consisting of a hydrogen atom, a halogen atom, trifluoromethyl, nitro, amino and di(lower)alkylamino, the two alkyl groups being identical;

$R^0$ is a member selected from the group consisting of a hydrogen atom, lower alkyl, lower alkenyl having a saturated α-carbon atom, lower alkynyl having a saturated α-carbon atom, and

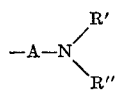

A is lower alkylene having a carbon chain of at least 2 carbon atoms;

each of R′ and R″ is lower alkyl;

$R^3$ is a hydrogen atom or methyl, but is restricted to a hydrogen atom when either $R^4$ or $R^5$ is lower alkyl;

$R^4$ is a member selected from the group consisting of a hydrogen atom and lower straight chain alkyl, but is a hydrogen atom when $R^3$ is methyl;

$R^5$ is a member selected from the group consisting of a hydrogen atom and lower straight chain alkyl, but is a hydrogen atom when $R^3$ is methyl;

$R^6$ is a member selected from the group consisting of a hydrogen atom, lower alkyl, a fluorine atom, a chlorine atom and a bromine atom, and is either in the 1- or the 2-position.

6. A compound of the formula

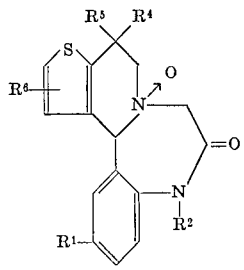

wherein $R^1$ is a member selected from the group consisting of a hydrogen atom, a halogen atom, trifluoromethyl and nitro;

$R^2$ is a member selected from the group consisting of a hydrogen atom, hydroxyl and alkyl having from 1 to 4 carbon atoms;

each of $R^4$ and $R^5$ is, independently, a member selected from the group consisting of a hydrogen atom, methyl, ethyl, propyl and butyl; and $R^6$ is a member selected from the group consisting of a hydrogen atom, alkyl having from 1 to 4 carbon atoms, a fluorine atom, a chlorine atom and a bromine atom and is either in the 1- or 2-position.

7. N-oxide of 12-chloro-9-methyl-4,5,7,8,9,13b-hexahydro-thieno[3,2-c]pyrido[1,2-d]benzo[1,4]diazepin-8-one.

References Cited

UNITED STATES PATENTS

| | | | |
|---|---|---|---|
| 2,811,527 | 10/1957 | Sheehan | 260—294.8 |
| 3,121,725 | 2/1964 | Schnitzer | 260—294.8 |
| 3,143,553 | 8/1964 | Ruschig et al. | 260—332.2 |
| 3,149,124 | 9/1964 | Krespan | 260—332.2 |
| 3,152,136 | 10/1964 | Harris | 260—332.2 |
| 3,300,481 | 1/1967 | Bell et al. | 260—239.3 |
| 3,300,482 | 1/1967 | Doebel et al. | 260—239.3 |

WALTER A. MODANCE, *Primary Examiner.*

R. T. BOND, *Assistant Examiner.*